(12) United States Patent
Simonutti

(10) Patent No.: US 10,413,781 B2
(45) Date of Patent: Sep. 17, 2019

(54) LOW COMPRESSION GOLF BALL

(71) Applicant: Wilson Sporting Goods Co., Chicago, IL (US)

(72) Inventor: Frank M. Simonutti, Wheaton, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 242 days.

(21) Appl. No.: 15/229,447

(22) Filed: Aug. 5, 2016

(65) Prior Publication Data

US 2018/0036601 A1  Feb. 8, 2018

(51) Int. Cl.
*A63B 37/08*  (2006.01)
*A63B 37/00*  (2006.01)
*C08K 5/098*  (2006.01)

(52) U.S. Cl.
CPC ........ *A63B 37/0039* (2013.01); *A63B 37/008* (2013.01); *A63B 37/0031* (2013.01); *A63B 37/0049* (2013.01); *A63B 37/0064* (2013.01); *A63B 37/0065* (2013.01); *A63B 37/0075* (2013.01); *A63B 37/0087* (2013.01); *A63B 37/0096* (2013.01); *C08K 5/098* (2013.01); *A63B 37/0045* (2013.01)

(58) Field of Classification Search
CPC .................................................. A63B 37/0075
See application file for complete search history.

(56) References Cited

U.S. PATENT DOCUMENTS

| | | | |
|---|---|---|---|
| 5,002,281 A | 3/1991 | Nakahara et al. | |
| 5,368,304 A | 11/1994 | Sullivan et al. | |
| 5,721,304 A | 2/1998 | Pasqua, Jr. | |
| 5,779,561 A * | 7/1998 | Sullivan | A63B 37/0003 273/DIG. 22 |
| 5,820,489 A * | 10/1998 | Sullivan | A63B 37/0003 473/377 |
| 5,932,661 A | 8/1999 | Simonutti | |
| 5,947,842 A * | 9/1999 | Cavallaro | C08L 9/00 473/373 |
| 5,965,669 A | 10/1999 | Cavallaro et al. | |
| 5,984,806 A | 11/1999 | Sullivan et al. | |
| 6,056,650 A * | 5/2000 | Yamagishi | A63B 37/0003 473/377 |

(Continued)

OTHER PUBLICATIONS

Jeff Dalton, Compression by Any Other Name, 2002, Routledge, Science and Golf IV, pp. 319-327.*

*Primary Examiner* — Eugene L Kim
*Assistant Examiner* — Matthew B Stanczak
(74) *Attorney, Agent, or Firm* — Terence P. O'Brien; Todd A. Rathe

(57) ABSTRACT

A golf ball includes a core, a mantle and a cover layer. The core includes polybutadiene and has a diameter of less than 1.45 inches. The core has a deflection of at least 0.225 inches under an applied static load of 200 pounds. The mantle includes at least one fully neutralized ionomer terpolymer comprising ethylene, carboxylic acid and an acrylate. The mantle composition has a flexural modulus of less than 10,000 psi. The core and the mantle form a core-mantle assembly having a diameter of between 1.540 inches and 1.580 inches with a deflection of greater than 0.210 inches under an applied static load of 200 pounds. The cover layer includes one or more ionomer materials and has a Shore D hardness of greater than 62.

18 Claims, 1 Drawing Sheet

(56) References Cited

U.S. PATENT DOCUMENTS

| | | | |
|---|---|---|---|
| 6,152,836 A | 11/2000 | Bradley et al. | |
| 6,203,450 B1 | 3/2001 | Bradley et al. | |
| 6,204,333 B1* | 3/2001 | Higuchi | A63B 37/0003 473/373 |
| 6,231,460 B1* | 5/2001 | Higuchi | A63B 37/0003 473/351 |
| 6,245,859 B1* | 6/2001 | Sullivan | A63B 37/0003 473/373 |
| 6,248,027 B1* | 6/2001 | Hayashi | A63B 37/0003 473/371 |
| 6,358,159 B1* | 3/2002 | Yamagishi | A63B 37/0003 473/374 |
| 6,409,614 B1* | 6/2002 | Binette | A63B 37/0003 473/351 |
| 6,613,842 B2 | 9/2003 | Rajagopalan | |
| 6,623,380 B2 | 9/2003 | Jordan | |
| 6,899,639 B2 | 5/2005 | Simonutti et al. | |
| 6,945,879 B2 | 9/2005 | Simonutti et al. | |
| 7,005,479 B2* | 2/2006 | Morgan | A63B 37/0003 473/373 |
| 7,008,972 B2* | 3/2006 | Sullivan | A63B 37/0003 473/371 |
| 7,014,572 B2 | 3/2006 | Simonutti et al. | |
| 7,048,649 B1* | 5/2006 | Watanabe | A63B 37/0003 473/351 |
| 7,067,081 B2 | 6/2006 | Simonutti et al. | |
| 7,148,262 B2* | 12/2006 | Danner | A63B 45/00 521/41 |
| 7,157,514 B2* | 1/2007 | Voorheis | A63B 37/0003 252/182.15 |
| 7,338,391 B2 | 3/2008 | Melanson et al. | |
| 7,431,669 B2 | 10/2008 | Lemons et al. | |
| 9,220,949 B2 | 12/2015 | Kim et al. | |
| 9,278,260 B1* | 3/2016 | Bartels | A63B 37/0087 |
| 9,421,425 B2 | 8/2016 | Loper et al. | |
| 9,636,545 B2* | 5/2017 | Farrell | A63B 37/0075 |
| 2001/0016522 A1* | 8/2001 | Watanabe | A63B 37/0003 473/371 |
| 2002/0022537 A1* | 2/2002 | Nesbitt | A63B 37/00 473/378 |
| 2002/0045497 A1* | 4/2002 | Watanabe | A63B 37/0003 473/371 |
| 2003/0096936 A1* | 5/2003 | Wu | A63B 37/0003 528/76 |
| 2004/0157681 A1 | 8/2004 | Lemons et al. | |
| 2005/0159247 A1 | 7/2005 | Lemons et al. | |
| 2005/0176523 A1* | 8/2005 | Boehm | A63B 37/0003 473/354 |
| 2006/0106145 A1* | 5/2006 | Kennedy, III | A63B 37/0031 524/322 |
| 2006/0166759 A1* | 7/2006 | Kennedy, III | A63B 37/0084 473/371 |
| 2006/0189413 A1* | 8/2006 | Boehm | A63B 37/0003 473/371 |
| 2008/0096693 A1* | 4/2008 | Boehm | A63B 37/0003 473/374 |
| 2014/0364253 A1* | 12/2014 | Sullivan | A63B 37/008 473/376 |
| 2015/0335959 A1* | 11/2015 | Sullivan | A63B 37/0043 473/371 |
| 2015/0367179 A1* | 12/2015 | Farrell | A63B 37/0075 473/374 |

* cited by examiner

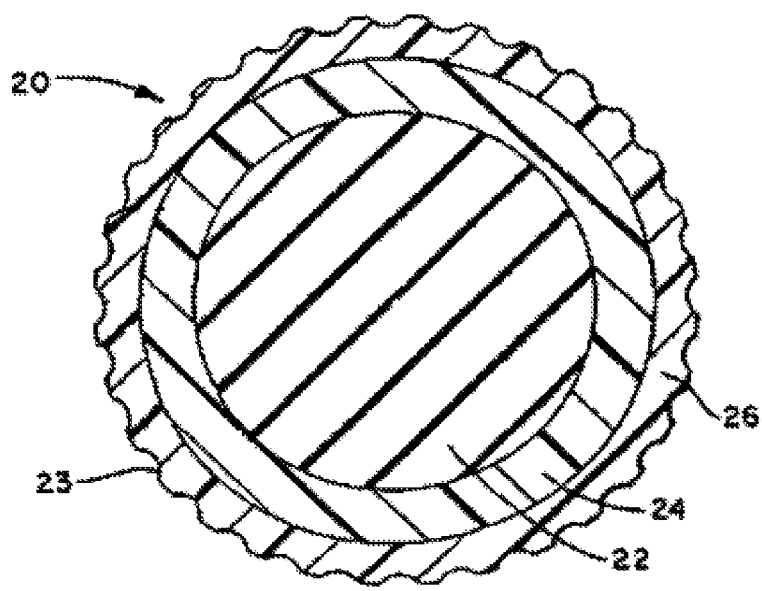

LOW COMPRESSION GOLF BALL

FIELD OF THE INVENTION

The present invention relates to the field of golf balls.

BACKGROUND

For a great number of years, golf balls were molded using wound cores, which comprised a soft rubber center surrounded by a layer of thread rubber windings. In the late 1960s to early 1970s, balls with ionomer covers (produced by E.I. du Pont de Nemours and Company, 1007 Market ST Wilmington, Del. 19898 ("DuPont") under the trade name Surlyn®) were introduced. Balls molded with Surlyn® covers were produced with both thread-wound cores and solid rubber cores. The balls molded using initial grades of Surlyn® and solid cores (hereafter referred to as "two-piece balls") were significantly less expensive to produce; however, the initial two-piece golf balls were hard, having an unpleasant feel to the golfer.

In the late 1980s, DuPont came out with softer Surlyn® terpolymer grades, known as Very Low Modulus Ionomers (V.L.M.I.). These materials allowed for development of two-piece golf balls with softer covers; however, use of high levels of V.L.M.I. results in a significant detrimental effect on the golf ball resilience. The limitation on balls made with V.L.M.I. materials was (is) that use of high levels of V.L.M.I. materials has a significant detrimental effect on golf ball resilience properties. Therefore, golf balls with soft covers could be made, but had relatively high compression; thus exhibiting high spin rates and low velocity.

In the mid- to late-1990s, softer, i.e. lower compression, distance type golf balls were developed. These golf balls included the addition of an intermediate cover layer. The additional layer allowed for greater control of the performance properties of the golf ball. In the late 1990's, multi-layer golf balls utilizing polyurethane outer covers were introduced. These balls were rapidly adopted by professional golfers due to their premium qualities. However, these balls required a hard feel to achieve the desired distance and spin properties.

Through a softer core, a golf ball molded with a stiff ionomer had a reasonable feel based upon a relatively low compression; however, the core compression can only be reduced to a certain level (a Professional Golfers Association (PGA) while retaining acceptable ball durability. If a core compression of below about 35 was used, impact durability of the golf ball was poor. A favorable byproduct of the use of a soft compression core in a golf ball was a lower spin rate, which allowed for better accuracy of the golf ball.

In 1998, Wilson Sporting Goods Co. ("Wilson"), 8700 West Bryn Mawr Avenue, Chicago, Ill. 60631, introduced a golf ball made using a core with about a 35 compression (sold under the trademark Staff® Titanium Straight Distance). In order to keep the velocity and performance properties of a premium distance golf ball, Wilson used a stiff ionomer cover layer on this ball. The ball compression of this golf ball was approximately 85, which was low for the time when it was introduced.

Existing golf balls, however, have some drawbacks. Prior art golf balls are generally manufactured with a core made primarily from polybutadiene rubber, which is covered with a fairly hard, thin, ionomer inner cover layer, which is subsequently covered by the polyurethane or balata/polybutadiene outer cover layer. While providing adequate playing characteristics at a less expensive production cost, these solid balls exhibit lower velocities at driver impact than wound balls using like cover materials. Prior art golf balls utilized either thermoplastic or thermoset material for the covers. The prior art thermoplastic material allows for greater ease in manufacturing, but reduces resilience. Conversely, thermoset material is difficult with which to work, but provides needed resilience.

In addition, all of the various materials used in the construction of golf balls, from wound core constructions through to multi-layer solid core constructions, have varying densities. Accordingly, the mass per unit volume of these materials varies. For example, typically, the materials used to produce the cover layer possess a lower mass per unit volume than the materials used to produce the core. Additionally, the material composition of most intermediate layers has a density or a weight per unit volume that is different than the density or weight per unit volume of the core and/or the cover layer. If a golf ball is manufactured perfectly, that is if the core or center of a ball is perfectly spherical, and if the cover layer thickness and intermediate layer thickness (if applicable) are constant throughout the entire ball, the ball will be "balanced", and should fly true when struck with a golf club, or should roll true when putted.

More recently, golf balls have been developed with significantly lower ball compression than was previously considered possible for a premium two-piece golf ball. The Wilson Staff Duo, Callaway Supersoft, and Bridgestone Extra Soft (produced by Bridgestone Sports Co., LTD., Omori Bellport E Bldg. 6-22-7, Minami-oi Shinagawa-ku, Tokyo 140-0013 Japan) have all been introduced in recent years, having compression ranging from about 40 to about 65. These balls are designed to produce low ball compression through the use of softer and larger cores, and softer cover materials (ionomer blends comprising varying levels of V.L.M.I. materials). These golf balls produce soft feel and reasonable distance performance, but are generally low spin and do not produce great control around the green.

Even more recently, low compression balls comprising three-layer construction have been developed. The Wilson Staff Duo Spin and Bridgestone e6 produced by Bridgestone Sports Co., LTD., Omori Bellport E Bldg. 6-22-7, Minami-oi Shinagawa-ku, Tokyo 140-0013 Japan) were developed having compression in the range of about 40 to about 60. The 3-piece balls provide distance performance with the added benefit of improved performance around the green. However, construction has been limited such that compression of less than about 40 has been difficult to achieve with acceptable performance and impact durability.

SUMMARY OF THE INVENTION

The invention is a golf ball comprising a three-piece construction that has extremely low compression (less than about 40, corresponding to a deformation of greater than about 0.140" under an applied load of 200 lb.) that comprises an extremely soft core and core/mantle assembly that produces extremely soft feel, distance performance and acceptable impact durability.

This invention will become more fully understood from the following detailed description, taken in conjunction with the accompanying drawings described herein below, and wherein like reference numerals refer to like parts.

BRIEF DESCRIPTION OF THE DRAWINGS

FIG. 1 is a sectional view of an example golf ball.

DETAILED DESCRIPTION OF EXAMPLES

FIG. 1 is a sectional view of an example golf ball 20. As will be described hereafter, golf ball 20 has a construction that provides a significantly high degree of deformation/deflection which corresponds to a significantly lower degree of compression than existing balls. The lower compression provides golfers with a softer feel. At the same time, the construction of golf ball 20 provides acceptable distance performance and comparable or higher spin as compared to other commercially available golf balls having lower degrees of deformation and corresponding higher degrees of compression.

In the example illustrated, golf ball 20 comprises a three-piece golf ball which has a deformation under an applied 200 lb. static load of at least 0.140". This correlates to a compression of less than 40. Golf ball 20 comprises core 22, mantle 24 and outer cover layer 26. Mantle 24 continuously extends about court 22. Outer cover layer 26 continuously extends about mantle 24. In the example illustrated, outer cover layer 24 has an outer surface having dimples 23.

Core 22 comprises a thermoset rubber composition that produces a molded core having a deformation under a 200 lb. static load of at least 0.220 inches. This correlates to a PGA compression of less than −40. The intermediate layer or mantle 24 comprises a thermoplastic material that has encloses the inner core layer and results in a core and intermediate layer component having a deformation under a 200 lb. static load of at least 0.210 inches. This correlates to a PGA compression of less than −30. The golf ball cover 26 also comprises a thermoplastic material forming a layer that encloses the core and intermediate layer. This outer cover 26 has a Shore D hardness between 40 and 70 Shore D and results in a golf ball deformation under a 200 lb. static load of at least 0.140".

In one implementation, core 22 comprises a polybutadiene based core. In one implementation, core 22 comprises a high cis-content polybutadiene rubber, a co-crosslinking agent, a free radical initiator, and fillers as necessary to provide acceptable density. In one implementation, the cis-1,4 content of the polybutadiene is greater than 94%. Polybutadiene rubber suitable use as the center can be synthesized using Nickel, Cobalt or Neodymium catalysts. Polybutadiene materials made using Neodymium catalyzed materials, such as Neodene-40 (available from Karbochem) and Euro-prene BR-40 (available from Polimeiri Europa) are the preferred rubber for the invention. Polybutadiene materials made using Nickel or Cobalt catalysts are also suitable for use in the invention.

In one implementation, the co-crosslinking agent comprises a Zinc salt of an unsaturated carboxylic acid. In one implementation, the co-crosslinking agent comprises Zinc Diacrylate. The zinc diacrylate can also comprise a level of fatty acid, wherein the fatty acid comprises an amount of 1-15% of the total weight of the zinc diacrylate and the fatty acid. Specific fatty acids include, but are not limited to, stearic acid, lauric acid, and palmitic acid.

In one implementation, the free radical initiator comprises a peroxide. In one implementation, peroxides such as dicumyl peroxide, tert-Butyl peroxybenzoate, Butyl 4,4'-di-(tert-butylperoxy) valerate, and 1,1-Di-(tert-butylperoxy)-3,3,5-trimethylcyclohexane are suitable for use. 1, 1-Di-(tert-butylperoxy)-3,3,5-trimethylcyclohexane (sold by Akzo under the tradename Triganox® 29) are well-suited for use in the core compound.

Fillers suitable for use in adjusting the density of the core can be chosen from the groups consisting of inorganic and organic materials. Preferred materials for adjusting the density of the core include inorganic materials such as Zinc Oxide, Barium Sulfate, Titanium Dioxide and mixtures thereof.

To obtain optimum performance, it may be beneficial that the core be of a diameter of less than 1.45", and more preferably no greater than 1.40". The deformation of the core under an applied static load of 200 lb. should be greater than 0.220", which correlates to a compression of −40. The small size and high deformation of the core will provide a low spin rate on shots made with a high club head speed, such as driver shots, and will also become less of an effect on the spin performance of the golf ball at low swing speeds, such as shots made with short irons and wedges. The low spin rate on high swing speed shots results in straighter flight, and as the core becomes less of an influence on the spin rate of the ball, the low spin imparted by the small, high deformation core does not result in low spin rate on short iron or wedge shots.

In one implementation, the intermediate layer or mantle 24 is comprised of a thermoplastic polymer comprising a copolymer of ethylene and a carboxylic acid, preferably acrylic acid or methacrylic acid, or a terpolymer of ethylene, a carboxylic acid (preferably acrylic acid or methacrylic acid) and an alkyl acrylate. The carboxylic acid groups of the copolymer or terpolymer are neutralized with metal ions. Preferably, 30 to 100% of the acid groups are neutralized with metal ions. Preferred metal ions for neutralization include monovalent metal ions such as sodium and lithium and divalent metal ions such as zinc and magnesium. In polymers where 100% of the acid groups are neutralized with metal ions, it is also preferred that the copolymer or terpolymer also comprises a level of fatty acid or metal salt thereof. Examples of preferred fatty acids and fatty acid metal salt materials include, but are not limited to, stearic acid, oleic acid, lauric acid, palmitic acid, eurcic acid, zinc stearate, magnesium stearate, zinc oleate, magnesium oleate, zinc laurate, magnesium laurate, zinc eurcicate, magnesium eurcicate, zinc palmitate, and magnesium palmitate.

In one implementation, the intermediate layer or mantle 24 is formed from a terpolymer of ethylene, an α, β-unsaturated carboxylic acid, and an n-alkyl acrylate. Preferably, the α, β-unsaturated carboxylic acid is acrylic acid, and the n-alkyl acrylate is n-butyl acrylate. It is imperative that the carboxylic acid in the intermediate layer is 100% neutralized with metal ions, preferably Magnesium ions. If the material used in the intermediate layer is not 100% neutralized, the resultant resilience properties such as Coefficient of Restitution (C.O.R.) and initial velocity will not be sufficient to produce the performance required for a premium golf ball. The intermediate layer can comprise various levels of the three components of the terpolymer as follows: from about 60 to about 80% ethylene, from about 8 to about 20% by weight of α, β-unsaturated carboxylic acid, and from about 5 to about 25% of the n-alkyl acrylate. One example of a suitable terpolymer comprises from about 75 to 80% by weight ethylene, from about 8 to about 12% by weight of acrylic acid, and from about 8 to 17% by weight of n-butyl acrylate, wherein all of the carboxylic acid is neutralized with Magnesium ions. Materials suitable for use as mantle materials are manufactured by E.I. DuPont de Nemours and Company and sold under the tradename DuPont® HPF® (High Performance Resin).

In one implementation, the intermediate layer has a flexural modulus of less than about 12,000 psi and a Shore D hardness (as measured on the curved surface of the intermediate layer) of less than about 50. The component formed from the core and the intermediate layer should have an outer diameter of between 1.52 and 1.60 inches and a deflection under an applied load of 200 lb. of at least 0.210 inches.

The outer cover layer 26 is comprised of a thermoplastic comprising a copolymer of ethylene and a carboxylic acid, preferably acrylic acid or methacrylic, a terpolymer comprising ethylene, a carboxylic acid (preferably acrylic acid or methacrylic acid) and an alkyl acrylate, or a blend of copolymer and terpolymer thermoplastic materials. The carboxylic acid groups of the copolymer and/or terpolymer thermoplastic ethylene copolymers are neutralized with metal ions. Preferably, 20 to 80% of the acid groups of the ethylene/acid copolymers/terpolymers are neutralized with metal ions. Preferred metal ions for neutralization include monovalent metal ions such as sodium and lithium and divalent metal ions such as magnesium and zinc. Materials suitable for use as cover materials are manufactured by E.I. DuPont de Nemours and Company and sold under the tradename Surlyn®.

In one implementation, the cover or cover layer 26 is formed from a composition formed of a blend of binary ionomers comprising ethylene, and α, β-unsaturated carboxylic acid and optionally an n-alkyl acrylate. In one implementation, the cover layer 26 comprises a blend of mid-acid binary ionomers comprising about 84 to 88% by weight of ethylene and 12 to 16% by weight of an α, β-unsaturated carboxylic acid, wherein about 40 to 70% of the carboxylic acid groups are neutralized with metal ions. Preferred metal ions include, but are not limited to: sodium, magnesium, lithium and zinc. In this form, the ionomer cover will have a hardness on a Shore D scale of 62 to 68. Further preferred is a blend of binary ionomers which comprise one or more components neutralized with a mono-valent metal ion and one or more components neutralized with a di-valent metal ion. A further preferred embodiment of the blend of binary ionomers is a blend of a mono-valent metal ions neutralized ionomer and a di-valent neutralized ionomer having a melt index, when tested at a temperature of 190° C. and a weight of 2.16 kg, of greater than 3.5 g/10 min.

In another implementation, the cover layer 26 may comprise a blend of mid-acid binary ionomer(s) comprising about 84 to 88% by weight of ethylene and 12-16% by weight of an α, β-unsaturated carboxylic acid wherein 40 to 70% of the carboxylic acid is neutralized with a metal ion, and a "very low modulus" terpolymer ionomer (or V.L.M.I.) comprising from about 67 to 70% by weight of ethylene, about 10% by weight of an α, β-unsaturated carboxylic acid, and from about 20 to 23% by weight of an n-alkyl acrylate, wherein about 70% by weight of the carboxylic acid is neutralized with metal ions. It is further preferred that the mid-acid binary ionomer(s) be neutralized with a mono-valent metal ion or a blend of mono-valent and di-valent metal ions, and the ternary V.L.M.I. materials be neutralized using di-valent metal ions. In this form, the binary/ternary ionomer cover blend will have a Shore D hardness of between 55 and 65. A further preferred embodiment of the blend of binary ionomer and ternary V.L.M.I. is a blend of binary ionomers having both mono-valent metal ions neutralized ionomer and di-valent neutralized binary ionomer blended with a ternary V.L.M.I. ionomer being neutralized with a di-valent metal ion, the binary/ternary ionomer blend having a melt index, when tested at a temperature of 190° C. and a weight of 2.16 kg, of greater than 2.5 g/10 min.

Golf balls molded as described above result in a very soft feel/low compression. Compression is a measurement of the deformation of the golf ball under a static load. As the deformation of the ball increases, the compression value decreases.

Compression is calculated based upon the deflection/deformation of the ball under an applied load of 200 lb.

Every 0.001" increase in deformation is equivalent to a decrease of one compression point.

Compression is calculated using the formula:

Compression=180−(deformation×1000)

(A core or ball can have a compression of less than zero).

TABLE 1

| Compression/Deflection Values | |
| --- | --- |
| Defl. | Comp. |
| 0.240" | −60 |
| 0.230" | −50 |
| 0.220" | −40 |
| 0.210" | −30 |
| 0.200" | −20 |
| 0.190" | −10 |
| 0.180" | 0 |
| 0.170" | 10 |
| 0.160" | 20 |
| 0.150" | 30 |
| 0.140" | 40 |
| 0.130" | 50 |
| 0.120" | 60 |
| 0.110" | 70 |
| 0.100" | 80 |
| 0.090" | 90 |

Balls that have a greater deformation/lower compression produce a ball that has a softer "feel" and a lower pitch/quieter sound than a ball with a lower deflection/higher compression. Testing regarding the feel of a golf ball indicates that the majority of golfers prefer softer compression balls. Testing shows that, regardless of handicap, golfers overwhelmingly prefer a softer (lower compression) golf ball over a harder (higher compression) golf ball.

Results of testing between lower compression (ball deflection of about 0.160 to 0.165 inches/compression of 35 to 40) and higher compression (ball deflection of about 0.125 to 0.130 inches/compression of about 55 to 60) showed the following:

67% of golfers prefer lower compression golf ball.

59% of golfers perceive lower compression golf ball to have higher spin rate.

This percentage is consistent regardless of the handicap of the golfer. Both single digit handicap players as well as 15+ handicap players show a preference of low compression/soft feel golf balls to harder/higher compression balls in the range of 65 to 70%. Testing further illustrates that in blind testing of golf balls, about 67% of golfers prefer the feel of a lower compression golf ball. Further, about 60% of golfers feel that the lower compression golf ball provides higher spin based solely on feel and sound of the golf ball. Golf ball 20 provides a high deformation/low compression golf ball that can be differentiated from other golf balls by "feel"/sound and is preferred by the majority of golfers.

EXAMPLES

The golf balls of the Examples were made as follows:

Core

A rubber core composition was mixed using the following formula:

TABLE 2

Core Formula

| Material | Phr |
|---|---|
| Karbochem Neodene 40 Polybutadiene | 100 |
| SR416D Zinc Diacrylate | 11 |
| Zinc Oxide | 5 |
| Barium Sulfate | 45.1 |
| Stearic Acid | 6 |
| Triganox 29A/88 | 0.90 |

Solid golf ball cores of the above formula were compression molded at a temperature of approximately 160° C. for approximately 7 minutes to produce a crosslinked core. After cooling, the core was glebarred (centerless ground) to a diameter of about 1.400". The finished core had a weight of about 29.5 grams and a deflection, compressed using an Instron testing machine and compressed to measure the deformation of the ball under an applied load of 200 lb., of about 0.230 to 0.240 inches. This correlates to a core compression of about −50 to −60.

Mantle

Example 1

A mantle was injection molded around the solid core described above. The material used for molding the mantle was a terpolymer comprising of 76% ethylene, ~8.5% acrylic acid, and ~15.5% by weight n-butyl acrylate, wherein 100% of the acrylic acid groups are neutralized with Magnesium ions. This material further comprises a level of between 10 and 150 phr of a fatty acid, specifically eurcic acid. This material is available from E.I. DuPont de Nemours and Company, under the product name DuPont® HPF® AD1172.

TABLE 3

DuPont® HPF® Properties

| Grade | Shore 'D' Hardness | Flexural Modulus (psi) |
|---|---|---|
| HPF 1000 | 52 | 31,000 |
| HPF 2000 | 55 | 12,000 |
| HPF AD1172 | 33 | 6,500 |

The cover of the golf ball of Example 1 was molded using a blend of ionomers as follows:

About 40% by weight of a copolymer comprising ~85% by weight of ethylene and ~15% by weight of methacrylic acid, wherein ~40 to 70% of the carboxylic acid is neutralized using Sodium ions, and About 40% by weight of a copolymer comprising ~85% by weight of ethylene and ~15% by weight of methacrylic acid, wherein ~40 to 70% of the carboxylic acid is neutralized by Zinc ions.

About 20% by weight of a "Very Low Modulus Ionomer", which is a terpolymer comprising ~70% by weight of ethylene, ~10% by weight of methacrylic acid, and ~20% by weight of n-butyl acrylate, wherein ~50-80% of the carboxylic acid is neutralized with Magnesium ions.

The above described Sodium ionomer is available from E.I DuPont de Nemours and Company under the tradename Surlyn® 8940, the above described Zinc ionomer is available from E.I DuPont de Nemours and Company under the tradename Surlyn® 9910, and the above described "Very Low Modulus Ionomer" is available from E.I DuPont de Nemours and Company under the tradename Surlyn® 9320.

Core-Mantle Assembly

TABLE 4

Core-Mantle Assembly Properties

| Material | Size | Defl. | Weight |
|---|---|---|---|
| Example 1 - HPF AD1172 | 1.560" | 0.251" | 36.01 |
| Duo Spin (control) - HPF 2000 | 1.562" | 0.200" | 36.29 |

Deflection - Amount of deflection measured under static load of 200 lb.
Mantles (and the underlying cores) of the Example yield a deflection of greater than 0.250" under an applied load of 200 lb.

Finished Example Golf Ball

TABLE 5

Golf Ball Physical Properties

| - Ball | Size | Defl. | Comp. | Weight | Shore 'D' | Coefficient Of Restitution 125 f/s | 175 f/s |
|---|---|---|---|---|---|---|---|
| Example 1 | 1.6830" | 0.1662" | 13.8 | 45.20 | 64 | 0.785 | 0.694 |
| Wilson Staff® Duo® Spin | 1.6831" | 0.1421" | 37.9 | 45.60 | 64 | 0.800 | 0.718 |
| Titleist® NXT Tour® | 1.6854" | 0.1007" | 79.3 | 45.61 | 62 | 0.803 | 0.739 |
| Bridgestone® e6® | 1.6855" | 0.1255" | 54.5 | 45.40 | 62 | 0.804 | 0.733 |

Shore 'D' Hardness - Measured using Shore D durometer manufactured by Shore Instruments - Hardness reading taken at surface of ball
Deflection: Deflection under 200 lb. applied load, using Instron Tensile Testing machine.
Compression: Correlated value using formula Compression = 180 − (Deflection * 1000)
C.O.R. (125 ft/s) - Ratio of Outbound/Inbound velocity - 125 ft/s inbound velocity test setup.
C.O.R. (175 ft/s) - Ratio of Outbound/Inbound velocity - 175 ft/s inbound velocity test setup.

Competitive/Control balls used in testing are as follows:
- Wilson Staff Duo Spin—3-piece construction comprising a small thermoset rubber core, a thermoplastic mantle and an ionomer cover.
- Titleist NXT Tour—3-piece construction comprising a dual layer core comprising 2 layers of thermoset rubber, and an ionomer cover.
- Bridgestone e6—3-piece construction comprising a thermoset rubber core, a thermoplastic mantle layer, and an ionomer cover.

Golf Ball Flight Performance

TABLE 6

Golf Ball Flight Performance Properties (90 mph clubhead speed)

| Ball | Carry Dist. (yd.) | Total Dist. (yd.) | Launch Angle (°) | Max. Height (yd.) | Ball Velocity (mph) | Spin (rpm) |
| --- | --- | --- | --- | --- | --- | --- |
| Example 1 | 199.7 | 222.5 | 13.4 | 25.0 | 129.3 | 2834 |
| Wilson Staff ® Duo ® Spin | 203.2 | 225.6 | 13.0 | 25.0 | 130.4 | 2793 |
| Titleist ® NXT Tour ® | 205.6 | 224.4 | 12.7 | 26.8 | 131.7 | 3003 |
| Bridgestone ® e6 ® | 203.9 | 226.0 | 13.0 | 24.7 | 130.8 | 2757 |

Driver test at 90 mph was performed with the following setup conditions:
Launch Angle - 12.8°
Spin Rate - 2800 rpm

TABLE 7

Golf Ball Flight Performance Properties (105 mph clubhead speed)

| Ball | Carry Dist. (yd.) | Total Dist. (yd.) | Launch Angle (°) | Max. Height (yd.) | Ball Velocity (mph) | Spin (rpm) |
| --- | --- | --- | --- | --- | --- | --- |
| Example 1 | 247.1 | 273.0 | 12.9 | 29.1 | 148.9 | 2359 |
| Wilson Staff ® Duo ® Spin | 250.4 | 276.5 | 13.0 | 30.7 | 150.4 | 2340 |
| Titleist ® NXT Tour ® | 253.7 | 277.7 | 12.6 | 33.4 | 152.5 | 2622 |
| Bridgestone ® e6 ® | 252.2 | 276.1 | 12.9 | 31.6 | 150.9 | 2361 |

Driver test at 105 mph was performed with the following setup conditions:
Launch Angle - 12.5°
Spin Rate - 2400 rpm The golf ball of Example 1 has a deformation of ~0.166" under an applied load of 200 lb. (which corresponds to a compression of ~14) which results in a softer feel when struck with the golf club. The results of flight testing show the golf ball of Example 1 to have relatively comparable distance performance compared to currently available 3-piece ionomer covered golf balls. The flight distance and spin rate of the ball of Example 1 indicates distance performance within 2 yards at Driver speed of 90 mph (Table 6). Surprisingly, the spin rate of the golf ball of Example 1 is very comparable to both the Wilson Staff Duo Spin and Bridgestone e6 commercially available balls. This is surprising as it is usually expected that a higher core deflection/lower core compression results in lower spin rate. In the construction of the ball of Example 1, it would appear that the use of the low modulus blend of fully neutralized DuPont HPF acid terpolymers results in higher spin rate than would be observed from blends of higher modulus DuPont HPF materials.

In summary, the ball of Example 1 made as specified above results in a significantly higher ball deformation. This corresponds to a significantly lower compression than existing balls, which corresponds to a softer feel of the ball to the golfer. In addition to the higher deformation/lower compression of the golf ball, the ball of Example 1 provides acceptable distance performance and comparable/higher spin than lower deformation/higher compression commercially available golf balls.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A golf ball comprising:
   a core comprising polybutadiene and having a diameter of less than 1.45 inches, the core having a deflection of at least 0.220 inches under an applied static load of 200 pounds;
   a mantle comprising a copolymer of ethylene and carboxylic acid, the mantle having a flexural modulus of less than 12,000 psi, wherein the core and the mantle form a mantle-core assembly having a diameter of between 1.52 inches and 1.6 inches with a deflection of greater than 0.210 inches under an applied static load of 200 pounds; and
   a cover layer comprising one or more ionomer materials, the cover layer having a Shore D hardness of greater than 62.

2. The golf ball of claim 1, wherein the polybutadiene has a cis-1,4 content of greater than 94%.

3. The golf ball of claim 1, wherein the core additionally comprises a co-cross-linking agent and a free radical initiator.

4. The golf ball of claim 3, wherein the co-cross-linking agent comprises a zinc salt of an unsaturated carboxylic acid.

5. The golf ball of claim 3, wherein the free radical initiator comprises a peroxide.

6. The golf ball of claim 1, wherein the core has a diameter of no greater than 1.40 inches.

7. The golf ball of claim 1, wherein the core has a deflection of at least 0.225 inches under an applied static load of 200 pounds.

8. The golf ball of claim 1, wherein the copolymer of the mantle comprises at least one ionomer, and wherein the at least one ionomer comprises a terpolymer of ethylene, a carboxylic acid and an acrylate.

9. The golf ball of claim 1, wherein at least 30% of the carboxylic acid of the mantle is neutralized with metal ions.

10. The golf ball of claim 1, wherein the carboxylic acid of the mantle is fully neutralized with metal ions.

11. The golf ball of claim 10, wherein the copolymer comprises a fatty acid or metal salt of the copolymer.

12. The golf ball of claim 1, wherein the copolymer comprises a terpolymer comprising 60 to 80% by weight ethylene, 8 to 20% by weight of α, β-unsaturated carboxylic acid and 5 to 25% by weight of n-alkyl acrylate.

13. The golf ball of claim 1, wherein the mantle has a flexural modulus of less than 10,000 psi.

14. The golf ball of claim 1, wherein the mantle-core assembly has a diameter of between 1.540 inches and 1.580 inches with a deflection of greater than 0.240 inches under an applied static load of 200 pounds.

15. The golf ball of claim 1, wherein the golf ball has a compression of less than 20, wherein the compression is determined based upon the formula Compression=180 minus (deformation×1000).

16. A golf ball comprising:
   a core comprising polybutadiene and having a diameter of no greater than 1.4 inches, the core having a deformation of at least 0.225 inches under an applied static load of 200 pounds;
   a mantle comprising at least one fully neutralized ionomer comprising a terpolymer of ethylene, a carboxylic acid and an acrylate, the mantle having a flexural modulus of less than 10,000 psi, wherein the core and the mantle form a core-mantle assembly having a diameter of between 1.540 inches and 1.580 inches with a deformation of greater than 0.240 inches under an applied static load of 200 pounds; and
   a cover layer comprising one or more ionomer materials, the cover layer having a Shore D hardness of greater than 62.

17. The golf ball of claim 16, wherein the polybutadiene has a cis-1,4 content of greater than 94%.

18. The golf ball of claim 16, wherein the golf ball has a compression of less than 20, wherein the compression is determined based upon the formula Compression=180 minus (deformation×1000).

* * * * *